Dec. 4, 1934.  J. C. DALEY ET AL  1,983,347
BUSHING MEANS
Filed June 22, 1931
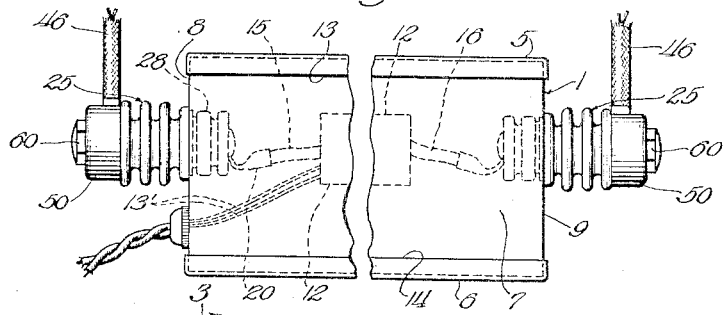
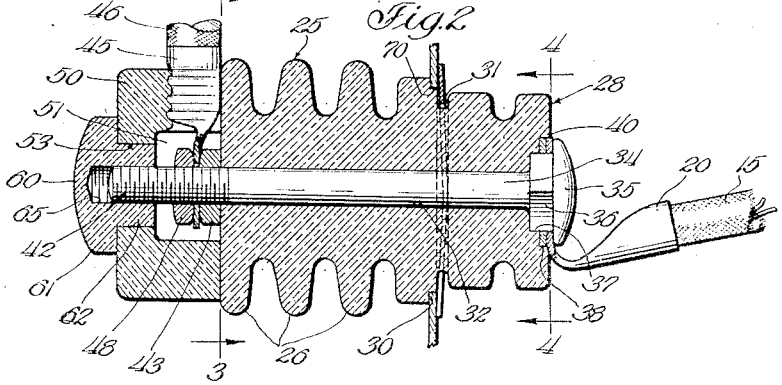
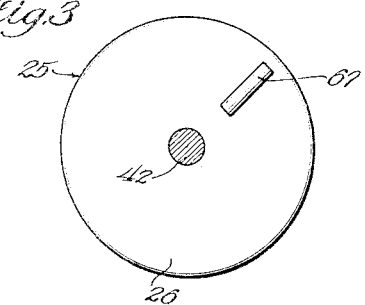
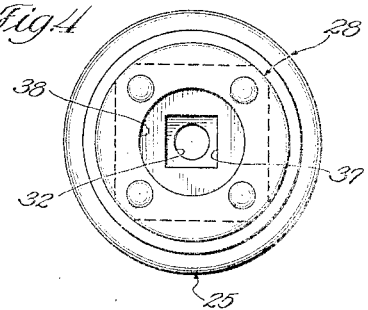
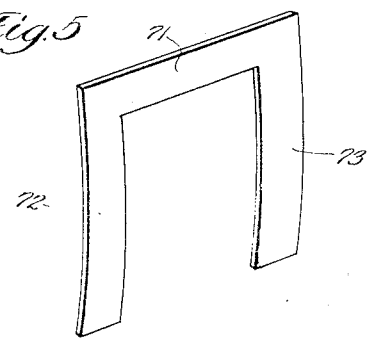
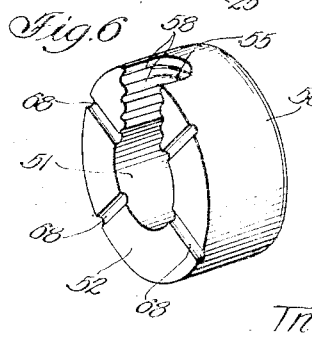
Inventors
James C. Daley
Edwin Goddard
By Brown, Jackson, Boettcher + Dienner
Attys.

Patented Dec. 4, 1934

1,983,347

UNITED STATES PATENT OFFICE 1,983,347

BUSHING MEANS

James C. Daley, River Forest, and Edwin Goddard, Chicago, Ill., assignors to Jefferson Electric Company, Chicago, Ill., a corporation of Illinois Application June 22, 1931, Serial No. 545,953

11 Claims. (Cl. 173—311)

The present invention relates generally to insulating bushings or other insulating means and contemplates certain features of construction which are particularly advantageous when used in transformer cabinets for gaseous tube signs or other devices.

In installations using neon and other gaseous tube signs, it is the usual practice to position the transformers or other means producing a high voltage within cabinets or casings. In order to insulate properly the high tension leads and the live parts of the transformer it is now customary to seal the transformer and associated parts in the cabinet by some insulating and sealing compound. In cases such as this the primary leads and the secondary leads are also sealed in. The cabinet itself is usually made of sheet metal or some other conducting material and it becomes necessary, therefore, to provide insulating bushings or other means to insulate properly the primary and secondary leads from the metal cabinet.

In the case of the primary leads this problem is not a serious one because the voltage between these leads rarely exceed 110 or 115 volts. This is not true, however, in the case of the secondary leads. Neon and other gaseous tube lamps require current at a high voltage. The insulating problems become more serious, therefore, in the case of the secondary leads because the insulating means for the secondary leads must be capable of insulating high voltages.

The principal object, therefore, of the present invention is to provide, in gaseous tube sign cabinets and similar apparatus, insulating means for the secondary or high tension leads which is so constructed and arranged as to be effective at these high voltages. It is also the purpose of the present invention to provide insulating means generally which is especially adapted for ease in mounting and assembling and which is also provided with means to positively clamp the outgoing leads or conductors in proper position in order to relieve these parts from bending and twisting stresses due to flexing or swinging of the outer ends of the secondary or high voltage leads.

While we have outlined above some of the generic features of the present invention, other objects and advantages of our invention will be apparent to those skilled in the art after a consideration of the following detailed description of the preferred structural embodiment, taken in conjunction with the accompanying drawing in which:

Figure 1 is a vertical elevational view showing a transformer cabinet for gaseous tube signs and the like and with which is associated our improved insulating bushing means;

Figure 2 is an enlarged cross-section through one of the bushings;

Figure 3 is a view taken substantially along the line 3—3 of Figure 2 and showing the projection formed on the body of the bushing for the purpose of holding the cap piece in place;

Figure 4 is an elevational view of the inner end of the bushing and corresponding to a view taken substantially along the line 4—4 of Figure 2;

Figure 5 is a perspective view showing one form of spring means for holding the bushing in place in the cabinet before the sealing compound is inserted; and Figure 6 is a perspective of the cap piece which is adapted to be mounted on the outer end of the body member of the bushing and which is provided with notches cooperating with a projection formed on the outer end of the bushing for properly aligning or positioning the cap piece with respect thereto.

Referring now more particularly to Figure 1, the cabinet or casing 1 is of generally rectangular configuration and is preferably formed of sheet metal or the like having a top wall 5, a bottom wall 6, side walls 7 and end walls 8 and 9. If desired the top wall 5 may be in the form of a hinged cover, and the top and bottom walls 5 and 6 are preferably provided with marginal flanges, 13 and 14 respectively, which embrace and receive the side walls and end walls of the cabinet.

The cabinet or casing 1 per se forms no part of the present invention and may therefore be of conventional construction, or it may be of the form or forms shown in the copending application of James C. Daley for improvements in sign cabinets filed April 21, 1930, Serial No. 446,039. We have, however, illustrated such a cabinet inasmuch as the improved insulating bushing means has particular cooperation with cabinets or casings generally of this type.

Generally speaking, such cabinets or casings, enclose a high voltage transformer 12 which may be of any suitable or preferred construction employing primary and secondary turns and operating to step up ordinary commercial voltages in the neighborhood of 110 volts to a voltage sufficiently high to operate properly neon or other gaseous tube signs or lamps. Since the details of the transformer itself do not particularly concern the present invention we have illustrated the transformer only diagrammatically. The primary leads to the transformer 12 are indicated by the reference numeral 13′ and the secondary leads coming from the transformer 12 are indicated by the reference numerals 15 and 16.

It is to be understood, however, that means other than a transformer may be employed for securing the high voltages required to operate gaseous tube signs. For example, if direct current is the only current available some form of induction coil or coils may be utilized, and it is to be understood that the transformer 12 is representative of this type of equipment.

The two secondary leads or conductors 15 and 16 are extended to opposite ends of the cabinet or casing 1 and at their outer ends are each provided with a terminal indicated by the reference numeral 20. The transformer or induction coil 12, the leads 15 and 16, the terminals 20, and the inner ends of the body members of the insulating bushings inside the cabinet are all sealed in by some form of sealing compound which itself acts as a dielectric or an insulator. This material substantially fills the cabinet 1, as is well understood in the art.

Since the bushing means referred to above as being provided at both ends of the cabinet 1 are, in the preferred structural embodiment, substantially identical only one of them will be described in detail.

Referring now more particularly to Figure 2, the reference numeral 25 indicates the body member of one of the bushings, and preferably the bushing is provided with a plurality of fins or skirts 26 to increase its insulating capacity. The body member of the bushing 25 is formed with an inner reduced end 28, which is also flanged. A shoulder 30 is formed between the body portion proper and the inner reduced end 28 and inwardly of the shoulder 30 is a groove 31 for a purpose to be described later. The bushing 25 is also provided with a central aperture 32 to receive a bolt formed of conducting material. The bolt 34 is provided with a head 35 having a square shank 36, and this shank is adapted to set in a square opening 37 formed at the inner end of the end 28. The bolt 34 and the recess 37 are so dimensioned that the bolt is prevented from turning relative to the bushing whenever the square shank 36 is positioned in the recess. In addition, a circular recess 38 is also provided at the inner end 28 of the bushing and this is adapted to receive one end of the terminal 20. A washer 40 if desired may be seated in the bottom of the circular recess 38 in order to properly space the bottom of the square shank in the square recess 37 so that when the bolt is tightened the head 35 securely clamps the end of the terminal 20 in place.

The bolt 34 is provided with an elongated threaded end 42 which extends outwardly beyond the outer end of the body portion of the bushing 25. A lock nut 43 is threaded onto the end 42 of the bolt and when tightened serves to clamp effectively the bolt 34 in the bushing and to hold the terminal 20 in place at the inner end of the bushing. The threaded end 42 also receives the apertured end of a terminal 45 with which one of the leads 46 is connected. The leads 46 are connected to the gaseous tube sign or lamp or equivalent device. A second nut 48 serves to clamp the terminal 45 in place on the bolt 34.

It has been found that under certain conditions swinging or flexing of the lead or conductor 46 would serve to bend the terminal 45 near its junction with the bolt 34 and, if continued, this flexing or bending would cause the inner end of the terminal 45 to crystalize and eventually break. In order to obviate such a defect as this the present invention contemplates the provision of a cap piece to be placed over the outer end or threaded end 42 of the bolt and to clamp the lead or conductor 46 to the body portion of the bushing so that the flexing thereof will not cause any shifting of the terminal 45. In Figure 2 the reference numeral 50 indicates as a whole the cap piece formed of insulating material. As best shown in Figures 2 and 6 the cap piece 50 is provided with an interior chamber or recess 51 and a marginal flange portion 52. The cap piece is also provided with an opening 53 of substantial diameter and arranged to receive the outermost end 42 of the bolt 34 with substantial clearance.

The marginal flange 52 is provided at one portion with a notch or recess 55. This notch is provided with grooves and serrations 58 in order to clamp securely the base of the terminal 45 of the conductor 46 or the insulated portion of the conductor received therein. Preferably, the bushing 25 and the cap piece 50 are formed of refractory dielectric material such as porcelain, although glass or other similar material may be employed if desired. The cap piece 50 is secured in place by means of a nut member 60 which is also formed of porcelain or other insulating material. This nut member includes a radial flange 61 which is adapted to seat against the outer portion of the cap piece 50 and an inner portion 62 which is received within the aperture 53 in the cap piece. The nut member 60 is provided with a threaded bore 65 which is adapted to be threaded on the outer end of the bolt 34.

The cap piece 50 may be secured to the body portion 25 of the bushing in a number of positions, depending upon which way it is desired that the conductor 46 should lead. Cooperating aligning means is formed on the cap piece and the body portion of the bushing, and as illustrated in Figures 3 and 6 such aligning means consists of a radial projection 67 on the outer end of the bushing and a plurality of correspondingly formed notches 68 on the flange 52 of the cap piece 50. The notches are formed to receive the projection 67 and to prevent the cap piece from turning relative to the bushing proper. Since four notches 68 are shown the cap piece may be positioned on the bushing in four different positions and which, when the nut member 60 is tightened, is securely held in place, at the same time securely clamping the conductor 46 in proper position. Obviously, a greater or a less number of notches 68 may be provided if desired and such is contemplated by the present invention.

In order to change the direction in which the lead or conductor 46 extends relative to the cabinet 1 all that it is necessary to do is to remove the nut 60 and the cap piece 50 and then loosen the nut 48 so that the terminal 45 may be readjusted relative to the bolt 34. Then when the terminal 45 is in proper position the cap piece 50 is replaced with one of its notches 68 engaging the projection or ridge 67 so that the notch 55 embraces the terminal. Next the nut member 60 is threaded onto the end 42 of the bolt and when drawn up causes the serrations or ridges 58 in the notch 55 to engage securely the terminal 45 or insulation on the lead 46 to hold the lead or conductor securely in the position desired. Any bending or flexing of the lead or conductor 46 will not cause the terminal 45 to crystalize and break off at the point where it is secured to the bolt 34.

As referred to above, the two bushings 25 are adapted to have their inner ends extend within the cabinet 1 and to be seated therein when the sealing compound is applied. As best shown in Figure 1, the bushings 25 are positioned in the end walls 8 and 9. In order that they may be securely sealed in by the sealing compound, it is, of course, necessary that the bushings be put in place before the sealing compound is applied. It is likewise necessary that the bushings be properly held in place during the process of casting the sealing compound in the cabinet 1. The present invention contemplates an improvement in this respect, namely, the provision of means for securely holding the bushings during the sealing-in process.

Referring now more particularly to Figures 2 and 5, before the terminal 20 and the bolt 34 are applied to the bushing, the bushing is inserted into an aperture 70 in the end wall so that the shoulder 30 of the bushing is received against the outer surface of the end wall. The groove 31 is so arranged that when the shoulder is against the end wall it lies approximately flush with the inner surface of the end wall. When the bushing is so positioned a spring member 71 is placed in the groove 31 on the inside of the cabinet 1. As shown in Figure 5 this spring member 71 comprises a yoke formed of resilient material and has portions 72 and 73 which are adapted to pass on either side of the bushing and in the groove 31. These portions 72 and 73 are bowed so that when the member 71 is in place it exerts a tendency to draw the shoulder 30 against the wall 8, thereby holding the bushing in proper position. Obviously, the member 71 may be in any form and may, if desired, be a snap or spring ring. After both bushings 25 are inserted and held in the cabinet 1 in this manner the connections 15 and 16 are brought out from the transformer 12 and the bolt 34 is then passed through the openings in the terminals 20 and then inserted through the bushings. Next the lock nut 43 is applied to each of the bolts 34 so that the outer end of the terminals are securely clamped to the bushing. The cabinet is now ready to be filled with the sealing compound, and this may be done either before or after the leads or conductors 46 are connected as outlined above.

It is important to note that the spring ring members 71 act at all times to hold the bushing in place, not only before the sealing compound is applied and during the process of inserting the sealing compound, but also after the compound is in place. Normally, of course, the sealing compound serves to hold all the parts on the inside of the cabinet in place, but if it should occur that the sealing compound is ineffective for this purpose the spring members 71 are in place and active at all times to secure the bushings in the cabinet.

Preferably, the bushing and the cap piece are both formed of porcelain or other insulating material and, as embodied in a commercial form, the bushing and cap piece are formed of double dipped brown glazed porcelain, the entire, or at least the main portion, of the bushing being glazed.

While we have shown and described above the preferred structural embodiment of the present invention, it is to be understood that our invention is not to be limited to the specific means shown and described, but that, in fact, widely different means may be employed in the practice of the broader aspects of our invention, as defined in the appended claims.

What we claim, therefore, and desire to secure by Letters Patent is:

1. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, means cooperable with the outer end of said cap member and with said electrical conductor for closing the opening in the outer end of the cap member and clamping the inner end of the rim of said cap member to the bushing, and cooperating means formed on the inner end of the rim of the cap member and on the outer end of the bushing for aligning the cap member with respect to the bushing and holding independently of the conducting lead the cap member against turning movement with respect to the bushing 2. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, means cooperable with the outer end of said cap member and with said electrical conductor for closing the opening in the outer end of the cap member and clamping the inner end of the rim of said cap member to the bushing, and cooperating means formed on the inner end of the rim of the cap member and on the outer end of the bushing for aligning the cap member with respect to the bushing and holding independently of the conducting lead the cap member against turning movement with respect to the bushing, said last means being cooperable in different angular positions of said cap member with respect to said bushing for the purpose of directing the opening in the rim of the cap member in different directions to accommodate different directions of entry of said lead into said cap member for connection to the electrical conductor extending through the bushing.

3. A device of the class described comprising an insulating bushing having a longitudinal opening, a conducting stem extending through said opening and from the end of said bushing, a conducting lead connected to the extending end of said stem, an insulating cap member having an outer end provided with an opening and an integral rim enclosing the connection between the lead and the conducting stem and seating at its inner end upon the outer end of the bushing, the rim of the cap member having a lateral opening through which the conducting lead may extend, an insulating nut member having an integral stem-like part extending into the opening in the outer end of the cap member and threaded upon the projecting end of the conducting stem, and an integral radial flange seating against the outer end of the insulating cap and closing the opening therein, said nut clamping the inner end of the rim of said cap member to the bushing, and cooperating means formed on the inner end of the rim of the cap member and on the outer end of the bushing for aligning the cap member with respect to the bushing and holding independently of the conducting lead the cap member against turning movement with respect to the bushing.

4. A device of the class described comprising an insulating bushing having a longitudinal opening, a conducting stem extending through said opening and from the end of said bushing, a conducting lead connected to the extending end of said stem, an insulating cap member having an outer end provided with an opening and an integral rim enclosing the connection between the lead and the conducting stem and seating at its inner end upon the outer end of the bushing, the rim of the cap member having a lateral opening through which the conducting lead may extend, an insulating nut member having an integral stem-like part extending into the opening in the outer end of the cap member and threaded upon the projecting end of the conducting stem, and an integral radial flange seating against the outer end of the insulating cap and closing the opening therein, said nut clamping the inner end of the rim of said cap member to the bushing, and cooperating means formed on the inner end of the rim of the cap member and on the outer end of the bushing for aligning the cap member with respect to the bushing and holding independently of the conducting lead the cap member against turning movement with respect to the bushing, said last means being cooperable in different angular positions of said cap member with respect to said bushing for the purpose of directing the opening in the rim of the cap member in different directions to accommodate different directions of entry of said lead into said cap member for connection to the conducting stem extending through the bushing.

5. A device of the class described comprising an insulating bushing having a longitudinal opening, a conducting stem extending through said opening and from the end of said bushing, a conducting lead connected to the extending end of said stem, an insulating cap member having an outer end provided with an opening and an integral rim enclosing the connection between the lead and the conducting stem and seating at its inner end upon the outer end of the bushing, the rim of the cap member having a lateral opening through which the conducting lead may extend, and an insulating nut member having an integral stem-like part extending into the opening in the outer end of the cap member and threaded upon the projecting end of the conducting stem, and an integral radial flange seating against the outer end of the insulating cap member and closing the opening therein, said nut member clamping the inner end of the rim of said cap member to the bushing.

6. A device of the class described comprising an insulating bushing having a longitudinal opening, a conducting stem extending through said opening and from the end of said bushing, a conducting lead connected to the extending end of said stem, an insulating cap member having an outer end provided with an opening and an integral rim enclosing the connection between the lead and the conducting stem and seating at its inner end upon the outer end of the bushing, the rim of the cap member having a lateral opening through which the conducting lead may extend, and a plurality of circumferentially spaced radial notches in the inner end of the rim, an insulating nut member having an integral stem-like part extending into the opening in the outer end of the cap member and threaded upon the projecting end of the conducting stem, and an integral radial flange seating against the outer end of the insulating cap member and closing the opening therein, said nut member clamping the inner end of the rim of said cap member to the bushing and an integral radial rib on the end of the bushing for engagement in any of the radial notches in the inner end of the rim to hold the cap member against turning without strain on the connection between the conducting stem and conducting lead with said cap member in different positions and the lateral opening in the rim directed in different directions.

7. A device of the class described comprising an insulating bushing having a longitudinal opening, a conducting stem extending through said opening and from the opposite ends of said bushing, an enlarged head at one end of said stem for clamping a conducting lead, means threaded upon the other end of the stem for connecting a second lead to said other end and operable to clamp the head at the first end of said conducting stem to the adjacent end of the bushing, a cap member having an outer end provided with an integral rim enclosing the connection between said second lead and said stem, the rim of said cap member having a lateral opening through which said second lead may extend, means cooperating with the outer end of said cap member and threaded upon the conducting stem for closing the opening in the outer end of the cap member and clamping the inner end of the rim of said cap member to the bushing, and means formed on the inner end of the rim of the cap member and on the outer end of the bushing and cooperating in different angular positions of the cap member to prevent flexing of the second lead from being transmitted to the connection between said second lead and said conducting stem.

8. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, means cooperable with the outer end of said cap member and with said electrical conductor for closing the opening in the outer end of the cap member and clamping the inner end of the rim of said cap member to the bushing, and means for maintaining coaxial relation between the cap member and the bushing and for holding independently of the conducting lead the cap member against turning movement with respect to the bushing.

9. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, means cooperable with the outer end of said cap member and with said electrical conductor for closing the opening in the outer end of the cap member and clamping the inner end of the rim of said cap member to the bushing, cooperating means formed on the inner end of the rim of the cap member and on the outer end of the bushing for holding independently of the conducting lead the cap member against turning movement with respect to the bushing, and means for maintaining coaxial relation between the cap member and the bushing.

10. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, and means cooperable with the outer end of said cap member and with said electrical conductor for closing the opening in the outer end of the cap member and clamping the inner end of the rim of said cap member to the bushing.

11. A device of the class described comprising an insulating bushing having a longitudinal opening, an electrical conductor extending through said opening and from the end of said bushing, a conducting lead connected to the extending end of said conductor, a cap member having an outer end provided with an opening and an integral rim enclosing the connection between said lead and said conductor and seating at its inner end upon the outer end of said bushing, the rim of said cap member having a lateral opening through which the conducting lead may extend, means cooperable with the outer end of said cap member and with said electrical conductor for closing the opening in the outer end of the cap member and clamping the inner end of the rim of said cap member to the bushing, and means for holding the cap member against turning movement with respect to the bushing.

JAMES C. DALEY.
EDWIN GODDARD.